H. WILSON.
SHEAVE BLOCK.
APPLICATION FILED FEB. 11, 1911. RENEWED JUNE 25, 1912.
1,050,896.
Patented Jan. 21, 1913.
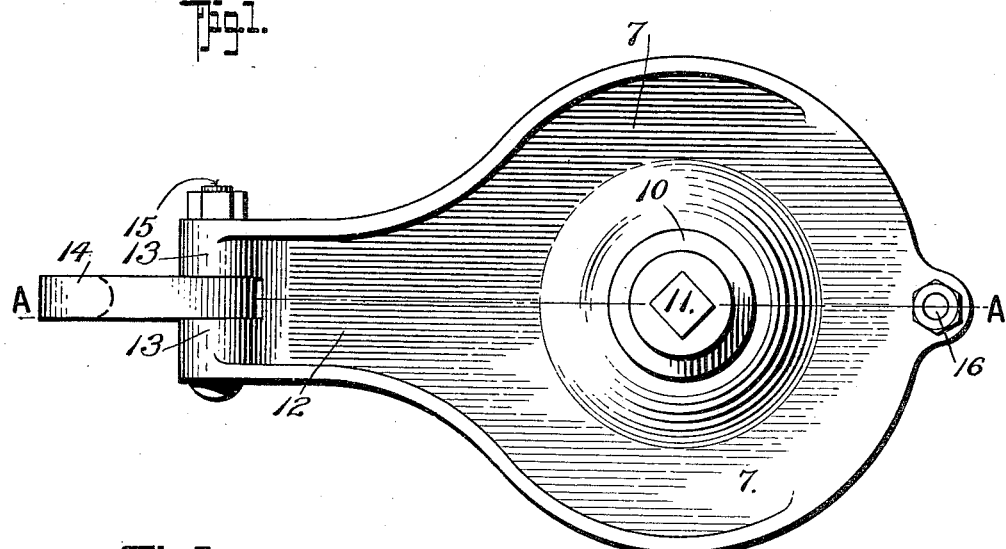
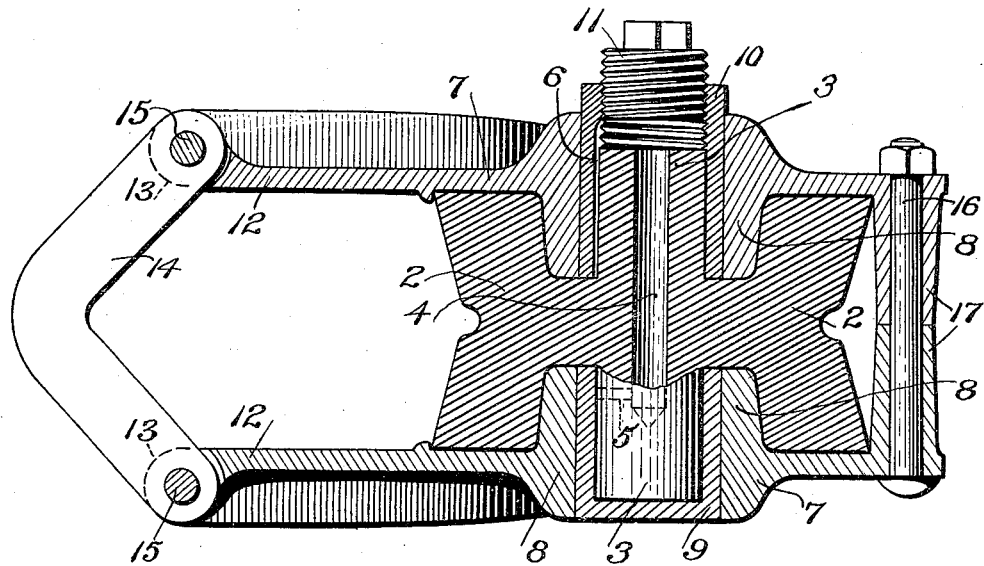
WITNESSES:
Charles H. Wagner.
John J. Schrott
INVENTOR
Harry Wilson
BY
Fred G. Dietrich & Co.
ATTORNEYS

UNITED STATES PATENT OFFICE.

HARRY WILSON, OF VANCOUVER, BRITISH COLUMBIA, CANADA.

SHEAVE-BLOCK.

1,050,896. Specification of Letters Patent. Patented Jan. 21, 1913.

Application filed February 11, 1911, Serial No. 607,954. Renewed June 25, 1912. Serial No. 705,869.

*To all whom it may concern:*

Be it known that I, HARRY WILSON, citizen of the Dominion of Canada, residing at Vancouver, in the Province of British Columbia, Canada, have invented a new and useful Sheave-Block, of which the following is a specification.

This invention relates to a sheave block of that class known to the logging industry as a bull block which is used to divert the main line of a wire rope log haul. The sheaves of these blocks require to be of considerable width to enable the various hooks or other connections of the wire rope to pass freely through, require also exceptional provision to exclude dust and dirt as they lie on the ground and the continual movement of the rope and tackle through them conveys and deposits in the block a considerable amount of dirt which works its way with the bearings of the sheave.

In the bull block which is the subject of this application provision is made to carefully inclose the pin and to exclude dust and dirt. The bearings of the block are carried into the sides of the sheave in a manner to prevent ingress of grit from the sheave, as it will be required to work against the natural centrifugal tendency of the spent lubricant outward.

The invention is particularly described in the following specification, reference being made to the drawings by which it is accompanied, in which:

Figure 1 is a plan of the block, and Fig. 2, a section on the line A A in Fig. 1 the pin on one side being shown in elevation.

In these drawings 2 represents a wide grooved sheave of hard cast iron or steel having, integral with it, an axle pin 3 projecting from each side. An annular recess is provided on each side of the sheave 2 and in close proximity to the pin 3. The pin 3 is provided from the upper side with an ample hole 4 which communicates with one 5 delivering to the upper end of the lower pin. The upper pin derives its supply through a groove 6 cut in the bearing toward the side of suspension of the block.

The side plates 7 of cast steel are alike and are each provided with an inwardly projecting boss 8 which fits closely without contact into the recess provided in each side of the sheave 2. They are uniformly bored to receive bearing bushes 9 and 10, the lower one 9 of which is formed with a closed end and the upper one 10 projects beyond the outer face of its side plate and is threaded to receive a grease retaining plug or cap 11.

Toward the place of suspension or fastening the side plates are extended, as at 12, to afford an ample space to clear the tackle which will be required to pass through the block, and are each provided with double eyes 13 between which extends a strong yoke member 14 connected by pins or bolts 15 to each. This yoke 14 is angled outward from the block to provide a centering attachment. This pin connected yoke 14 and a bolt or pin 16 through the bosses 17 projecting inward from the side plates 7, are what hold the side plates together on the interplaced sheave.

It will be noticed that the inwardly projecting bosses 8 of the side plates 7 closely conform to the inwardly projecting recesses in the sides of the sheave 2 so that although contact is maintained through the bearing bushes on the projecting pins of the sheave no space is left between the projecting bosses 8 and the sheave through which dust or dirt may penetrate from the sheave to the bearings and as the lubricant cannot escape from the bearings other than around the bosses 8 in their recesses of the sheave, the outward movement of the spent lubricant under the natural centrifugal tendency, will effectually prevent grit or dirt reaching the bearing of the pin.

The block is strong, is simple and inexpensive to manufacture and is thoroughly effective for the duty for which it has been designed. In use as it is in a horizontal or slightly inclined position with the grease plug 10 at the upper side, the lubricant will be delivered toward the upper end of each bearing of the pin and the spent lubricant passing outward will carry with it any dust or grit that would otherwise endeavor to enter.

Having now particularly described my invention and its objects, I hereby declare that what I claim as new and desire to be protected in by Letters Patent, is:

1. In a sheave block, the combination with a sheave having an annular recess on each side adjacent to the pin, of side plates having pin bearing bosses projecting inward and conforming closely to the annular recesses of the sheave, said bosses fitting closely all the walls of the respective annular recesses.

2. In a sheave block, the combination with a sheave having integral with it a pin projecting from each side, an annular recess immediately surrounding the junction of the pin with the sheave, side plates having each an inwardly projecting boss designed to closely fit the annular recess of the sheave, removable bearing bushes secured in the side plates one of which bushes has a closed end and the other an end projecting from the side plates and threaded to receive a closing cover, said bosses fitting closely all the walls of the respective annular recesses.

3. In a sheave block, a pair of side plates having inwardly projecting bearing bosses, a sheave having a bearing pin mounted in said bosses and having annular recesses on each side around said bearing pins to receive said bosses, said side plates loosely contacting the sides of said sheave and said bosses loosely filling said annular recesses, substantially as shown and for the purposes described.

4. In a sheave block, a pair of side plates having inwardly projecting bearing bosses, a sheave having a bearing pin mounted in said bosses and having annular recesses on each side around said bearing pins to receive said bosses, said side plates loosely contacting the sides of said sheave and said bosses loosely filling said annular recesses, and means for flowing lubricant around said pin in said bosses and out between said bosses, and side plates and sheave to form a film lubricant between the sheave and the side plates and bosses.

In testimony whereof I have signed my name to this specification in the presence of two subscribing witnesses.

HARRY WILSON.

Witnesses:
ROWLAND BRITTAIN,
MAY WHYTE.

---

Copies of this patent may be obtained for five cents each, by addressing the "Commissioner of Patents, Washington, D. C."